Oct. 31, 1967  G. NOËL  3,349,610
SOIL DEFORMATION MEASURING CELL WITH POSITIONING LINER
Filed Oct. 6, 1966                                   2 Sheets-Sheet 2

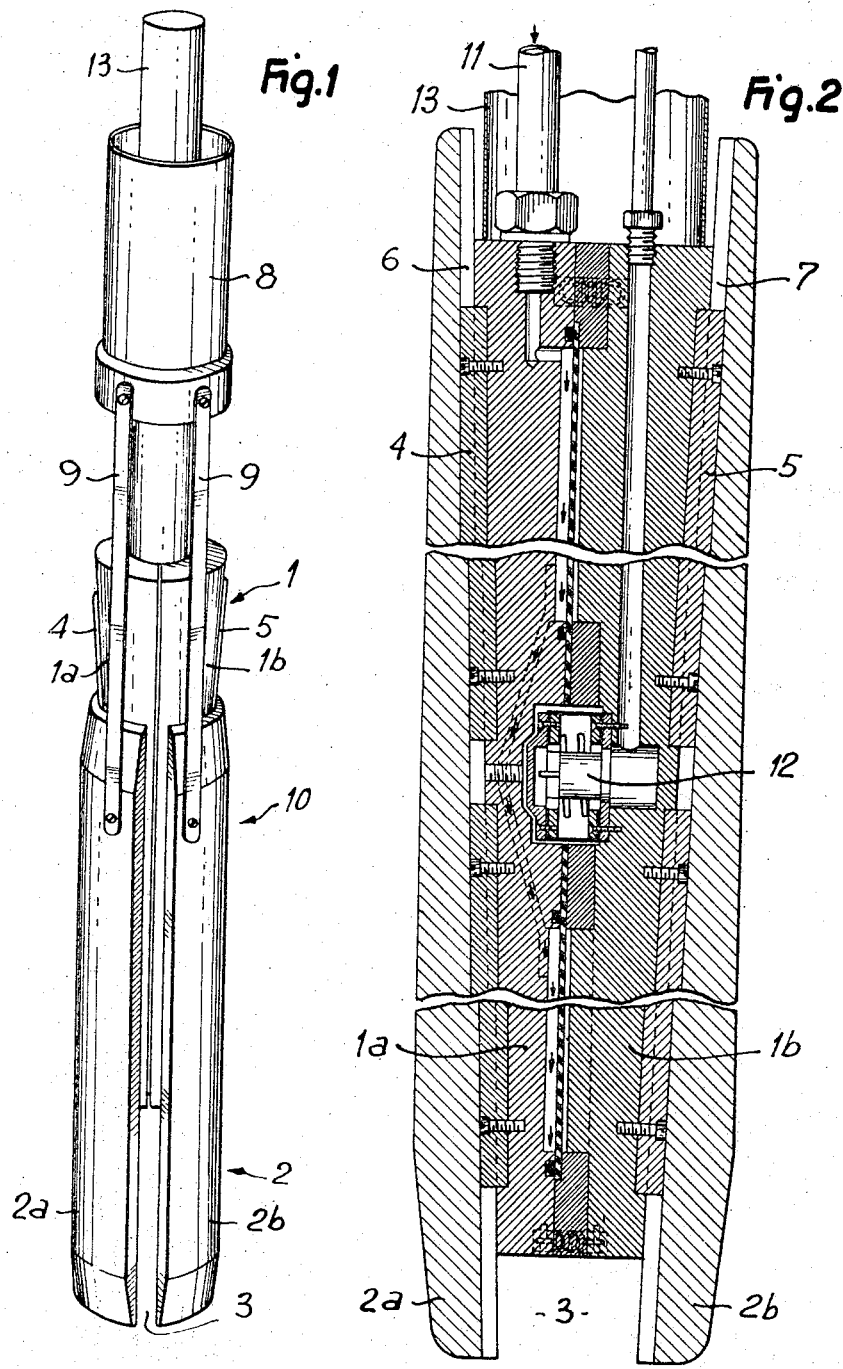

INVENTOR:
Georges Noël,
By Ernest F. Marmorek
His Attorney.

United States Patent Office 3,349,610
Patented Oct. 31, 1967

3,349,610
SOIL DEFORMATION MEASURING CELL WITH POSITIONING LINER
Georges Noël, Vincennes, Seine, France, assignor to Centre Experimental de Recherches et d'Etudes du Batiment et des T.P., Paris, France, a corporation of France
Filed Oct. 6, 1966, Ser. No. 584,771
Claims priority, application France, Dec. 28, 1962, 920,064
2 Claims. (Cl. 73—84)

ABSTRACT OF THE DISCLOSURE

An outer radially expansible hollow lining member for a deformation measuring assembly having a substantially cylindrical external surface and a downwardly tapered axial bore, and cooperating with a measuring cell of generally frusto-conical shape, adapted to slide axially into said lining member, whereby positioning and recovery of the measuring assembly is facilitated.

---

The present application is the continuation-in-part of copending application Ser. No. 333,032 filed Dec. 24, 1963, now abandoned.

The present invention relates to soil or rock deformation measuring assemblies and more particularly, to devices for placing such assemblies in position for measurement.

Deformation measurements in soil or rock layers are of importance in many different fields, such as geology, mining, oil prospection, etc. They are generally performed by driving into a borehole dug in the material to be tested, a measuring cell. This cell is then made rigid with the material, at a predetermined depth therein, by providing a suitable tamping, such as plaster, cement or the like, in the gap between the cell body and the walls of the borehole. The measuring cell is usually of the expansion type, the cell being radially expansible by supplying a suitable pressure; the deformation modulus of the material is calculated, for example, by plotting the pressure applied to the cell against the expansion measured.

Such measurements can therefore take place only after the time-consuming and cumbersome operations of placing the measuring device by providing a suitable tamping around the measuring cell. Besides, it is impossible to know whether the tamping fits tightly or not around the cell and against the wall of the borehole, thus it is not known whether some idle expansion of the cell can take place which would lead to inaccurate measurements. Furthermore, when deep measurements are performed, the recovery of the measurement device is seldom possible.

It is an object of the present invention to overcome such drawbacks by providing a deformation measuring device of simple and efficient construction and operation adapted to be placed in measuring conditions without the provision of any tamping around it.

Another object of the present invention is to provide a deformation measuring assembly comprising an outer lining member co-operating with an inner measuring cell to permit ready positioning of the device at a given depth in a borehole prior to the expansion of the measuring cell.

It is a further object of the invention, to provide a deformation measuring assembly having a hollow expansible outer lining member permitting an easy recovery of the measuring assembly in the case of very deep measurements.

A still further object of the invention is to provide a deformation measuring device having an outer lining member adapted to substantially reduce idle expansion of the measuring cell for any shape of the borehole cross-section, thus permitting more accurate measurements.

These and other objects, advantages and features of the invention will become more fully apparent as reference is had to the accompanying specfiication and drawings wherein:

FIGURE 1 is a perspective view of the deformation measuring assembly of the invention wherein the measuring cell is shown introduced to a small extent into its lining member.

FIGURE 2 is a longitudinal cross-sectional view of the measuring assembly wherein the measuring cell is placed inside its lining member, in retracted position, ready to be expanded for measurement.

Figure 3:
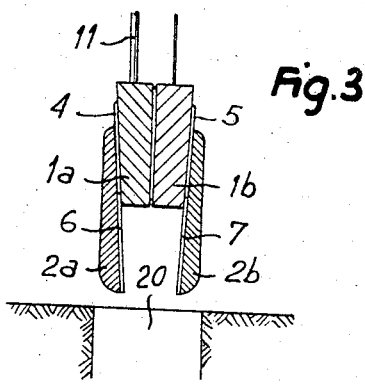
FIGURE 3 is a schematic cross-sectional view of the deformation measuring assembly in position to be driven into a borehole for deformation measurement, the measuring cell being in its retracted position and half-way into its lining member.

Referring now to the drawings and particularly FIGURE 1, there is illustrated a deformation measuring assembly 10 comprising an expansible measuring cell 1 of generally frusto-conical shape and an expansible outer lining member 2 consisting of two identical shells 2a and 2b having substantially cylindrical outer surfaces. The lining member 2 has a downwardly tapered axial bore 3 into which the frusto-conical surface of the measuring cell 1 mates perfectly.

The measuring cell 1 is provided with a pair of diametrically opposite longitudinal fins 4 and 5 adapted to slide inside corresponding grooves 6 and 7 of the inner surface of respective shells 2a and 2b.

A driving sleeve 8 is connected to lining member 2 by means of a plurality of link members 9.

A pipe 13 can be fixed on top of measuring cell 1 by any suitable means.

As best seen in FIGURE 2 the measuring cell 1 consists of two cooperating elements 1a and 1b adapted to be moved radially away from or towards the axis of the cell. The expansion of measuring cell 1 can be performed by any conventional means, for example by circulating a suitable fluid under pressure through pipe 11, connected to a pressure source (not shown). The distance the two elements 1a and 1b move apart from each other against the resistance to deformation of the material to be tested is measured by a suitable transducer 12 of any conventional type.

It should be understood that, except for its outer frusto-conical shape cooperating with a hollow lining member, the measuring cell herein disclosed is of conventional type, preferably of the expansion type. Consequently, the expansion means and the resulting deformation measuring means, being not part of the present invention, need not be disclosed in fuller details.

Figure 4:
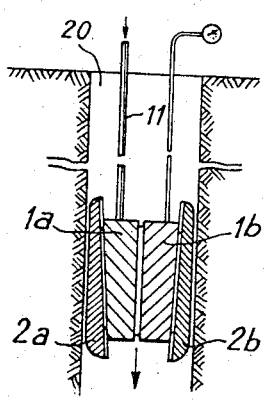
FIGURE 4 is a schematic cross-sectional view of the measuring assembly in position at measuring depth, the measuring cell being in its retracted position and fitting tightly inside its lining member.
Figure 5:
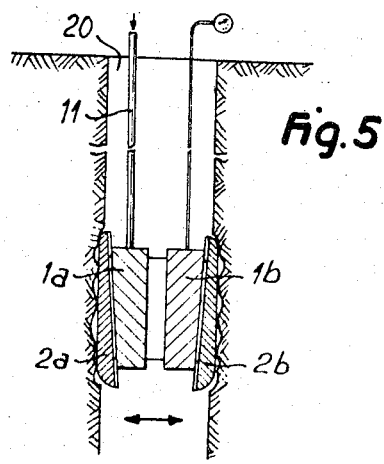
FIGURE 5 is a schematic cross-sectional view of the measuring assembly after the measuring cell has been expanded for deformation measurement.

FIGURES 3 to 5 illustrate how the deformation measuring assembly of the invention is placed in position for deformation measurement into a borehole dug in the material to be tested, soil, rock layer, etc.

FIGURE 3 shows the assembly prior to its driving into a borehole 20. The measuring cell 1 is in retracted position, the two elements 1a and 1b being in close relationship, and introduced to a small extent only into the outer lining member 2, the two shells 2a and 2b of which are also in close relationship relative to each other.

In FIGURE 4 the assembly 10 has been driven down to the desired depth at which the deformation measurement is to be performed. When this depth is reached, the central measuring cell is thrust inwardly into the hollow lining member 2, thereby causing the two shells 2a and 2b to be spread apart, the measuring cell 1 acting as a male wedge and the hollow lining member 2 acting as an expansible female wedge. By this wedge action, the two shells 2a and 2b are tightly applicated against the wall of the borehole 20, thus ensuring correct positioning of the deformation measuring assembly 10, whatever irregular is the section of said borehole.

After the assembly is put in position at the desired depth, the expansion of the measuring cell 1 can take place by applying a suitable pressure against the resistance to deformation of the tested material. As shown in FIGURE 5, the two elements 1a and 1b of the measuring cell 1 move away radially from each other pushing out the two shells 2a and 2b against the wall of the borehole 20.

From the foregoing, it will be clearly understood that the accuracy of the deformation measurements are considerably increased as compared with the conventional method wherein the measuring cell, generally of cylindrical shape, is made rigid with the wall of the borehole by means of a plaster or cement tamping which will always allow for some idle expansion of the cell. It will be also understood that after the measurements have been completed, the measuring cell 1 comes back to its retracted position and can be easily slid out of the hollow lining member 2, thereby enabling it to be recovered together with its lining.

What is claimed is:

1. In a deformation measuring assembly comprising a radially expansible measuring cell, driving means for driving said assembly in position for measurement and expansion means for expanding said measuring cell from a retracted position to an expanded position for the measurement of deformation characteristics of a material, the improvement in which said assembly comprises means for releasably pre-expanding to facilitate positioning and recovery of said measuring assembly including an outer radially expansible hollow lining member having a substantially cylindrical external surface and a downwardly tapered axial bore, said measuring cell having an external surface of frusto-conical shape with the same taper as said axial bore of said lining member, said measuring cell being adapted to slide axially, in said retracted position, into and out from said axial bore of said lining member, whereby the introduction and the removal of said frusto-conical measuring cell, in said retracted position, by axial sliding respectively into and out from said lining member permit respectively positioning and recovery of said measuring assembly before and after actuation of said expansion means for said deformation measurements of said material.

2. In a deformation measuring assembly comprising a radially expansible measuring cell, driving means for driving said assembly in position for measurement and expansion means for expanding said measuring cell from a retracted position to an expanded position for the measurement of deformation characteristics of a material, the improvement in which said assembly comprises means for releasably pre-expanding to facilitate positioning and recovery of said measuring assembly including an outer radially expansible hollow lining member, said lining member comprising two cooperating shells having cylindrical external surface and downwardly tapered internal surface and defining a downwardly tapered axial bore, said measuring cell having an external surface of frusto-conical shape with the same taper as said axial bore of said lining member, said measuring cell being adapted to slide axially, in said retracted position, into and out from said axial bore of said lining member, said shells being operable to be moved radially between a retracted position and an expanded position by said axial sliding of said measuring cell as well as by actuation of said expansion means of said measuring cell.

References Cited

UNITED STATES PATENTS

| 1,655,133 | 1/1928  | Clase   | 33—162  |
| 1,673,802 | 6/1928  | Crago   | 166—211 |
| 2,524,984 | 10/1950 | Manvers | 33—178  |
| 2,898,761 | 8/1959  | Hast    | 73—88   |

FOREIGN PATENTS 529,361    7/1931    Germany.

JAMES J. GILL, *Acting Primary Examiner.*

RICHARD C. QUEISSER, C. I. McCLELLAND,
*Examiners.*